United States Patent

Finnegan

[15] 3,639,974
[45] Feb. 8, 1972

[54] ROLL BONDING AN ALUMINUM-FERROUS COMPOSITE WITH GROOVED ROLLS

[72] Inventor: Walter D. Finnegan, Concord, Calif.
[73] Assignee: Kaiser Aluminum & Chemical Corporation, Oakland, Calif.
[22] Filed: Feb. 2, 1970
[21] Appl. No.: 7,776

[52] U.S. Cl. ...........................29/493, 29/471.1, 29/472.3, 29/497.5, 228/44
[51] Int. Cl. .....................................B23k 5/22, B23k 31/02
[58] Field of Search ................29/471.1, 472.3, 497.5, 488, 29/493; 228/44

[56] References Cited

UNITED STATES PATENTS

| | | | |
|---|---|---|---|
| 645,409 | 3/1900 | Weber | 72/234 X |
| 828,272 | 8/1906 | Charlton | 72/234 X |
| 2,693,121 | 11/1954 | Dight | 29/497.5 |
| 3,220,106 | 11/1965 | Clark | 29/497.5 X |
| 3,269,004 | 8/1966 | Smith, Jr. et al. | 29/471.1 |
| 3,320,666 | 5/1967 | Dion | 29/497.5 X |
| 3,340,597 | 9/1967 | Stein et al. | 29/497.5 X |
| 3,350,772 | 11/1967 | Vlam et al. | 29/497.5 X |
| 3,384,946 | 5/1968 | Ward, Jr. | 29/472.3 X |
| 3,481,023 | 12/1969 | Jost et al. | 29/472.3 |
| 3,499,211 | 3/1970 | Dubuc | 29/497.5 X |

Primary Examiner—John F. Campbell
Assistant Examiner—Richard Bernard Lazarus
Attorney—James E. Toomey, Paul E. Calrow, Harold L. Jenkins and Frank M. Hansen

[57] ABSTRACT

A method for forming long lengths of composite material suitable for the subsequent manufacture of transition inserts comprising assembling a ferrous element and an aluminum element and, if necessary, an aluminous bonding element into a prebond sandwich, heating the sandwich to a temperature between 400° and 900° F. and subjecting the sandwich to a one-step thickness reduction by passing the sandwich through matching, rectangularly grooved rolls thereby forming a sound, solid phase metallurgical bond between the elements.

5 Claims, 8 Drawing Figures

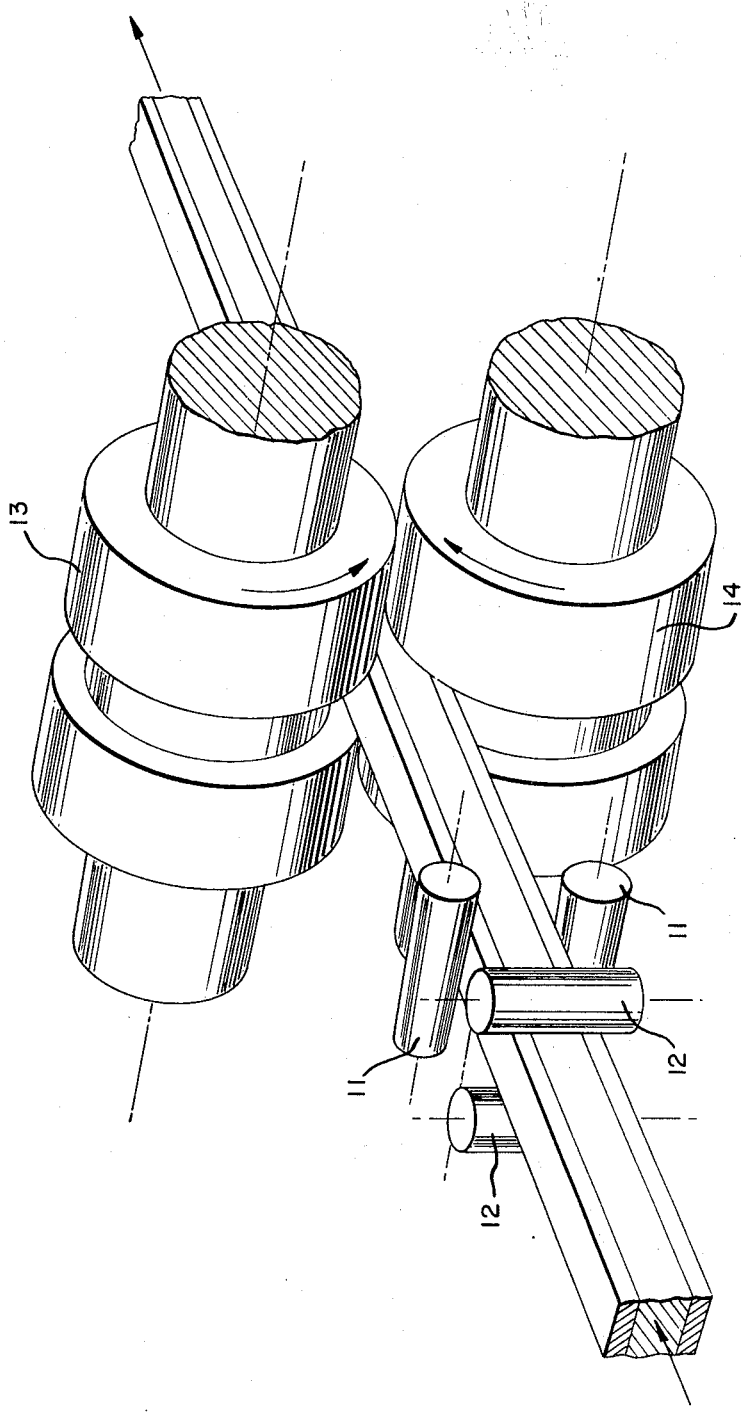
WALTER D. FINNEGAN
INVENTOR.
BY Frank M Hansen
ATTORNEY

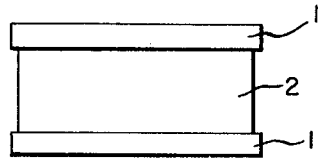
FIG_2
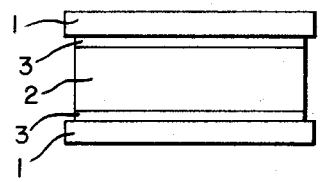
FIG_2A
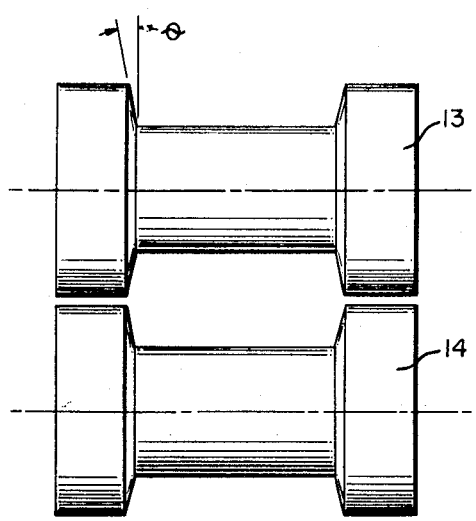
FIG_3
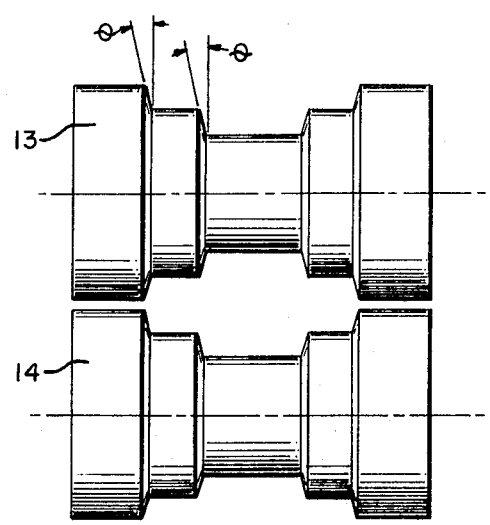
FIG_3A
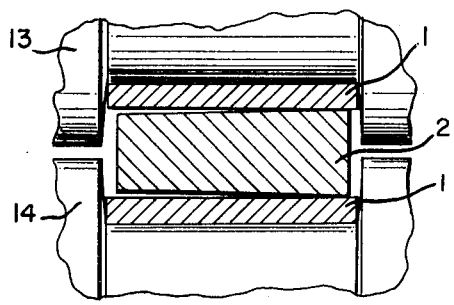
FIG_4
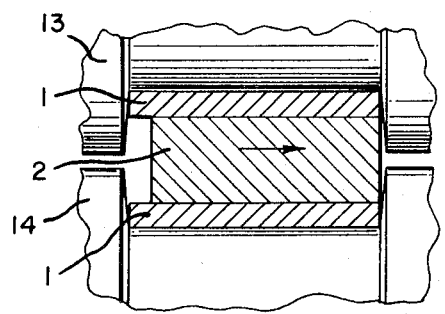
FIG_4A
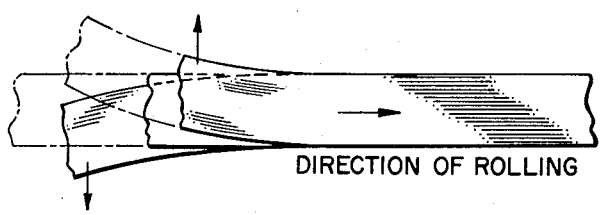
DIRECTION OF ROLLING
FIG_5
WALTER D. FINNEGAN
INVENTOR.
BY *Frank M Hansen*
ATTORNEY

ROLL BONDING AN ALUMINUM-FERROUS COMPOSITE WITH GROOVED ROLLS

BACKGROUND OF INVENTION

This invention relates to a process for forming long lengths of composite material which is suitable for joining steel and other ferrous materials to aluminum or aluminum alloys by conventional fusion welding techniques.

It is frequently desirable in structural, cryogenic, and electrical conductor applications to connect steel and other ferrous materials to aluminum. Mechanical connections between aluminum and ferrous materials normally are not desired because of the severe crevice corrosion which is effected between these materials, and because of the lack of leak tightness and low conductivity of such a connection.

The welding of ferrous materials to aluminum materials by conventional fusion welding techniques is undesirable due to the formation, during the welding process, of intermetallic compounds such as $AlFe_3$ at the interface between the aluminum and ferrous materials, which results in a highly brittle bond between the two materials.

To avoid the problems associated with the mechanical connecting of ferrous material to aluminum, and the welding of ferrous materials to aluminum, the transition insert has been developed. This is a composite having a relatively thick ferrous material on one side and a relatively thick aluminum material on the other side. The ferrous side of the insert can be fusion welded to a ferrous member and the aluminum side can be fusion welded to an aluminum member.

The composite material itself must have sufficient strength to maintain the structural integrity between the ferrous and aluminum members which have been welded to the composite. Prior methods of forming this transition insert material such as by casting molten aluminum onto a ferrous element generally have been unsatisfactory due to the formation of intermetallics at the interface between the ferrous element and the aluminum element, which produce the same type of brittle bond as the welding of a ferrous member to an aluminum member mentioned above. It has been found, however, that by pressure bonding or pressure welding a ferrous element to an aluminum element the intermetallic formation at the interface of these two materials is substantially eliminated. Several processes have been developed to produce such a transition insert such as explosion bonding and roll bonding and the like.

The pressure bonding or pressure welding of aluminum to steel creates a sound, solid phase metallurgical bond between the two materials. Although not wishing to be limited to the following explanation, it is believed that the elongation or deformation of the aluminum adjacent to the ferrous element fragments the oxide film on both the aluminum and ferrous elements causing intimate metal-to-metal contact and forming a sound, solid phase metallurgical bond. The bond interface is characterized by high strength, substantially as strong as the aluminum member, and low resistivity due to the absence of intermetallic compounds such as $AlFe_3$. With explosion bonding apparently a high-velocity jet emanating from the collision region fragments and removes any oxide or surface contamination on the mating surfaces.

The prior art roll bonding techniques, which comprise merely assembling the various elements loosely into a sandwich and then passing the sandwich through rolls, are deficient in that excessive lateral (to the direction of rolling) movement occurs between the various elements during rolling resulting in the "fishtailing" of the sandwich. This fishtailing severely limits the length of material that can be rolled.

The lateral excursions are caused primarily by the reduction of the aluminum member more along one side than along the other. The side subjected to the greater reduction is extended more than the other, creating a camber or lateral excursion of the aluminum member with respect to the ferrous member. The cambering of the aluminum member shifts the member with respect to the ferrous element which further aggravates the situation because that portion of the aluminum member not underlaid with the ferrous element is not substantially reduced by the rolling operation. This results in a fishtail effect which reduces the percent recovery of transition insert material and severely limits the length of material that can be produced.

It is the purpose of this invention to provide an improved process for roll bonding of long lengths of transition insert material without the prior art problems of lateral excursions of the aluminum members.

DESCRIPTION OF THE INVENTION

This invention relates to the roll bonding of aluminum to ferrous materials wherein the material to be bonded is assembled into a prebond sandwich, heated to rolling temperatures and then passed through rolls having matching, channel-shaped recesses thereby reducing the aluminum member adjacent to the ferrous member by at least 12 percent in thickness, preferably between about 20 and 50 percent. In accordance with this process, the mating surfaces of the elements to be bonded are cleaned, preferably with an abrasive detergent and by sanding, and then elements are assembled into a prebond sandwich. The prebond sandwich is heated to a temperature of at least 400° F. but below the temperature which any alloy phase is molten. However, normally the packs need not be heated above 90° F. At the lower temperatures the difference between the hot hardness of the aluminum element adjacent to the ferrous element and the ferrous element is normally of insufficient magnitude to allow adequate deformation of the aluminum element to obtain a sound solid phase metallurgical bond. At the higher temperatures there is a tendency for a relatively thick oxide layer to form on the mating surfaces which reduces the bonding efficiency. It is preferred to roll bond the sandwich as soon as possible after the rolling temperature is reached, and it has been found that the sandwich should not be maintained at the roll bonding temperature for more than about 1 hour because of the formation of the large amounts of oxide on the mating surfaces of the material. The sandwich is subsequently rolled in a one-pass operation to form the solid phase metallurgical bond. In order to make a bond that has a high strength over a relatively small unit area, as distinct from cladding where there is very little strength over a unit area, the aluminum element, whether it be a bonding layer or a facing plate, adjacent to the ferrous element must be reduced in thickness by at least 12 percent to produce an effective metallurgical bond, preferably between 20 and 50 percent. Even though multiple passes through the mill are contemplated, at least one pass must effect a reduction of the aluminum element adjacent to the ferrous element of at least 12 percent.

If the transition insert is to be employed in a strength bearing capacity, normally the aluminum member must be quite strong. However, to obtain a solid bond between the aluminum and ferrous material, there must be a large difference in hardness at the roll bonding temperature. With high-strength aluminum alloys such as the 7000 series and 2000 series (Aluminum Association designations), the hot hardness is not sufficiently lower than the ferrous element to efficiently roll bond the two and, therefore, it is advantageous to place a substantially more plastically deformable aluminum material between the strong aluminum alloy and the ferrous element. Suitable examples of these more deformable aluminum alloys are 1100 and 3003 alloys. The relatively soft interlayer must initially be at least 0.5 mm. thick to produce an effective metallurgical bond. If the transition insert is to be utilized in an electrical conducting capacity, such as in the anode rod assembly in aluminum reduction cells, then conductivity is the prime consideration, not strength. In this instance there is no need for a strong aluminum alloy and thus only a highly conductive alloy such as 3003, 1100 and 6061 need be used in conjunction with the ferrous material.

The function of the transition insert as explained above is to facilitate the fusion welding of the aluminum side of the insert to an aluminum member and fusion welding the ferrous side of the insert to a ferrous member. Of necessity, the thickness of the aluminum side and the ferrous side of the transition insert must be thick enough to accommodate the fusion welding to compatible materials. Generally, the thickness normal to the bonding interface between the aluminum element and the ferrous element should be at least 1 cm. after roll bonding, although the elements may be thinner if proper precautions are taken during welding to avoid the formation of intermetallics at the interface of the ferrous element and aluminum element adjacent thereto.

The accompanying drawings are provided to illustrate the process of rolling a sandwich comprising an aluminum element and ferrous elements in grooved rolls to form transition insert material.

FIG. 1 is a perspective view of the preferred apparatus for roll bonding in accordance with this invention.

FIGS. 2 and 2A are cross-sectional views of prebond sandwiches utilized in the process of the present invention.

FIGS. 3 and 3A are front view of rolling surfaces useful in the process of the present invention.

FIGS. 4 and 4A are cross-sectional views of the sandwich in the nip of the rolls in unbalanced rolling conditions.

FIG. 5 is a plan view of the fishtailing which occurs in prior art processes.

In the preferred operation of the present process, the sandwich construction shown in FIGS. 2 and 2A is prepared by placing ferrous members 1 on both sides of aluminum member 2. If the aluminum member is of a relatively high strength alloy, preferably interlayers or bonding layers 3 are placed between the mating surfaces of the ferrous and aluminum elements as shown in FIG. 2A. The sandwich is heated to a temperature between 400° and 900° and then passed through set of roller guides 11 and 12 shown in FIG. 1 and then into the matching channel-shaped recesses in rolls 13 and 14 to roll bond the ferrous elements 1 to the aluminum member 2.

Although the embodiments shown in FIGS. 2 and 2A are preferred in that they are vertically balanced, i.e., will not curl in the vertical direction upon exiting from the rolls, it is within the scope of the present invention to roll bond a sandwich having only one ferrous member. Moreover, it is within the scope of the present invention to reverse the position of the aluminum and ferrous members, i.e., place aluminum members on the outside of a core comprising one or more ferrous members.

As discussed above, in the prior art methods of roll bonding transition insert material, the percent recovery was quite low, primarily due to the lateral excursions of the aluminum element with respect to the ferrous element during the roll bonding operations. These lateral excursions of the aluminum member are due to the differential elongation between the sides of the aluminum member. There are several causes for this differential elongation; for example, the aluminum facing plate may have a variable thickness from edge to edge and as this is rolled, the thicker edge will tend to extend more than the thinner edge, causing the aluminum member to shift in the direction toward the thinner edge in the nip of the rolls. This shift moves the aluminum element with respect to the ferrous element (which normally experiences relatively little thickness reduction) causing the edge of the aluminum element to extend further beyond the edge of the ferrous element. Once this occurs the excursions are accelerated because the aluminum extending beyond the edge of the ferrous element is reduced relatively little, resulting in a fishtail effect as is shown in FIG. 5. Other factors such as the steel element having an increasing thickness from one edge to the other also creates the same effect because the area of the aluminum member adjacent to the thicker edge of the steel element will be extended more during rolling than the area of the aluminum member adjacent to the thinner edge of the ferrous element, promoting lateral excursions and finally the fishtail effect explained above.

It has been found that by roll bonding with rolling surfaces having continuous peripheral rectangularly shaped recess, such as described above, the excursions and resultant fishtailing experienced with the prior art methods of roll bonding thick materials is eliminated, and, as a result, long lengths of transition insert material can be made; for example, up to 25 feet or more.

In the process of the present invention, several limitations must be met for efficient roll bonding. The width of the aluminum member must be between about 85 and 98 percent of the width of the matching, channel-shaped recesses in the rolls. The vertical walls of the channel recesses in the rolls should not bind the steel element during rolling operations. The depth of the grooves in the rolls should be such that the rolls do not touch during the roll bonding operations and should be sufficient to ensure that the vertical walls of the grooves encase the edges of all components before the sandwich enters the nip of the rolls, i.e., before reduction begins. However, the depth of the recesses in each of the rolls need not be the same. The walls of the roll may be tapered to facilitate entry of the sandwich into the nip of the rolls. The angle of taper (angle shown in FIGS. 3 and 3A) preferably may range up to 10°. If it is desired to produce composite material having the steel elements covering only a portion of the aluminum element, the groove can be modified as shown in FIG. 3A wherein the groove is provided with an offset. If it is desired to expose a portion of only one face of the aluminum member, then only one of the rolls is provided with the offset.

When a soft interlayer is employed, efficient roll bonding is difficult with material widths greater than 36 inches. Apparently, the frictional forces developed during the rolling operations will tend, due to the self-balancing aspects of this invention to be discussed subsequently, to cause the thin interlayer to buckle and to fold over upon itself and thus reducing the bonding efficiency.

It should be noted, however, that the sidewalls of the grooves in the mill rolls do not merely physically restrain the relative movement between the various elements of the sandwich. In fact, complete physical restraint is not desired during the roll bonding of such composite material because longitudinal movement of the aluminum member adjacent to the ferrous member is required to obtain a sound metallurgical bond. A gap between the sidewalls of the groove and the aluminum elements in the nip of the rolls, i.e., when the sidewalls of the groove first encase the sandwich element, is necessary for the self-balancing characteristics of the process of the present invention. However, as mentioned above, the width of the aluminum members should never be less than 85 percent of the groove width.

The self-balancing aspects of the present invention can best be described in the following examples. If the aluminum member 2 enters the nip of the rolls having a wedge-shaped cross section, such as is shown slightly exaggerated in FIG. 4, the thicker edge of the aluminum member would be extended more longitudinally than the thinner edge of the wedge. This would cause the aluminum member to shift to the left thus tending to equalize the amount of aluminum across the width of the groove. Similarly, for example, if the aluminum member 2 entered the nip of the roll on the right-hand side of the groove, such as is shown in FIG. 4A, the action of the rolls would tend to form the aluminum member into a wedge-shaped cross section, the thicker edge being next to the right wall of the groove. The aluminum in contact with the groove wall could not spread laterally and thus all lateral movement would be toward the left. The thicker section on the right would be extended longitudinally more than the thinner section on the left, causing the aluminum member to shift in the direction of the thin edge and centering the aluminum member within the groove.

A minimum width of the aluminum element is particularly critical when a soft interlayer is being employed between the aluminum element and the ferrous element. If the width of the aluminum member is smaller than the described minimum, the interlayer has a tendency to crawl over the edge of the aluminum member which reduces the bonding efficiency.

Generally, the composition of the various elements does not effect the roll bonding process only insofar as the composition affects the hot hardness of these materials. Thus, a wide range of aluminum alloys and ferrous materials can be utilized within the process of this invention. The end use of the transition insert, however, may place some composition limits on the various members. For example, the aluminum member, to be effectively fusion welded by conventional procedures, normally would have less than 0.30 percent copper, and as a result, a high copper containing aluminum alloy will normally not be used. Nevertheless, it is within the scope of the present invention to produce a transition insert having an aluminum member with large amounts of copper. For example, 7075 alloy or 2024 alloy could be used and then a mechanical connection could be made with the aluminum side of the transition insert.

The critical factor when employing an aluminous interlayer is the deformability of the soft interlayer with respect to both the ferrous element and the aluminum member at roll bonding temperatures. Suitable interlayers are 1100 and 3003 alloys (Aluminum Association designations) although the composition need not be so limited. It should be noted that the difficulties involved in obtaining a sound bond are not between the soft interlayer and the ferrous element, but between the aluminum member and the interlayer, because at the higher temperatures the difference in deformability between the bonding layer and the aluminum member may be slight. That is, the unbonded areas in the transition insert material will lie between the two aluminum elements rather than the ferrous element and the interlayer.

It has been found that when roll bonding the carbon steels, particularly the low carbon steels, at the higher temperatures, i.e., above 600° F., the steel members have a tendency to produce large amounts of oxide on the surface which severely limits the amount of bonding between the carbon steel element and the aluminum element adjacent thereto. However, at the lower temperatures, which avoid the high rate of oxidation, it becomes difficult to reduce the thickness of the aluminum element without also reducing the thickness of the steel element by considerable amounts. As mentioned above, to obtain a solid phase metallurgical bond, there must be a substantial difference in deformability between the various elements at the roll bonding temperatures. Thus, it has been found that with carbon steels, particularly low-carbon steels, a soft interlayer should be used, preferably an aluminum alloy containing more than 99.0 percent aluminum, such as the 1100 alloy. The temperature should range between 400° and 550° F., preferably between 450° and 500° F. To avoid the problems involved with carbon steels, the carbon steel can be advantageously clad with stainless steel in which case the stainless steel side would be placed adjacent to the aluminum member. When roll bonding stainless steels to aluminum, the bonding temperature is preferably maintained above 600° F. but below the melting point of the alloy components in the aluminum, that is, normally below 900° F. Suitable ferrous elements include, but are not limited to stainless steels, low-carbon steels, high-carbon steels, and the like.

Several examples are given in the table to illustrate a preferred embodiment. The ferrous elements were three-eighth inch × 3.5 inch × 144 inch, Type 304 stainless steel plate, the aluminum elements were 1¼ inch × 3.2 inch × 144 inch, 7039-F aluminum plate and the interlayer was one-fourth inch × 3.2 inch × 144 inch, 1100-0 aluminum sheet. The various elements were cleaned with an abrasive detergent, sanded and then assembled into prebond sandwich comprising the 7039 plate as a core, interlayers on opposite faces of the core and the steel members adjacent to the exposed faces of the interlayers. The sandwiches were heated to roll bonding temperature and then passed through grooved rolls to effect the bond. The grooves in the rolls were 3.6 inch wide and 0.7 inch deep. The percent recovery, i.e., (area bonded/area available for bonding) × 100, was greater than 90 percent for all specimens.

Although this invention has been described in terms of making transition insert material, it is obvious that the present invention can be employed to metallurgically bond aluminum to ferrous materials notwithstanding the use of the composite material. However, this invention is directed primarily to forming relatively thick composite material, i.e., greater than 0.5 inch in thickness, and it is not directed to the cladding of steel with aluminum to improve corrosion resistance.

| Example No. | Rolling temp., °F. | Percent estimated reduction of Al layer adjacent ferrous element* | Percent total reduction of sandwich | Elongation of Fe member, in. | Elongation Al member, in. |
|---|---|---|---|---|---|
| 1 | 680 | 28 | 30.4 | 8 | 58 |
| 2 | 775 | 28 | 30.8 | 10 | 55 |
| 3 | 770 | 28 | 28.6 | 10 | 55 |
| 4 | 720 | 28 | 30.6 | 8 | 59 |
| 5 | 760 | 28 | 30.6 | 7 | 59 |
| 6 | 770 | 28 | 30.3 | 6 | 60 |
| 7 | 720 | 28 | 28.2 | 9 | 69 |
| 8 | 770 | 28 | 29.0 | 6 | 68 |
| 9 | 765 | 28 | 28.8 | 5 | 68 |
| 10 | 730 | 28 | 27.8 | 4 | 67 |

*This is typical reduction of the 1100 Al liner. Individual measurements not available.

I claim:

1. A process for producing an aluminum-steel composite plate at least 0.5 inch thick, characterized by passing elements of the composite to be bonded through rolling surfaces having matching, substantially rectangular, channel-shaped recesses comprising
    a. selecting at least one steel element and an aluminum element, said aluminum element characterized by having a width between about 85 and 98 percent of the width of the recesses,
    b. cleaning the mating surfaces of said elements,
    c. arranging said elements into a prebond sandwich comprising the aluminum element and a steel element on at least one face of the aluminum element and in alignment therewith,
    d. heating the prebond sandwich to a temperature between 400° and 900° F., and
    e. hot rolling the prebond sandwich at substantially the said temperature in a one-step thickness reduction by passing the sandwich through the matching channel-shaped recesses of the rolling surfaces to effect at least a 12 percent reduction in thickness of the aluminum element adjacent to the steel element.

2. The process of claim 1 wherein at least one of the roll surfaces in said recesses is provided with an offset, the depth of which is less than the thickness of the steel element.

3. The process of claim 1 wherein an aluminum interlayer element is positioned between each steel element and the aluminum element, said interlayer characterized by being substantially pure aluminum, being more plastically deformable than either the aluminum element or the steel element, being at least 0.5 mm. thick and being substantially thinner than either the steel element or the aluminum element.

4. The process of claim 1 wherein the aluminum element adjacent to the steel element is reduced in thickness between 20 and 50 percent.

5. The process of claim 3 wherein the aluminum interlayer is reduced in thickness between about 20 and 50 percent.

* * * * *

UNITED STATES PATENT OFFICE
CERTIFICATE OF CORRECTION

Patent No. 3,639,974          Dated February 8, 1972

Inventor(s) Walter D. Finnegan

It is certified that error appears in the above-identified patent and that said Letters Patent are hereby corrected as shown below:

Column 2, line 26, "90°" should be -- 900° --.

Signed and sealed this 20th day of June 1972.

(SEAL)
Attest:

EDWARD M. FLETCHER, JR.      ROBERT GOTTSCHALK
Attesting Officer              Commissioner of Patents